United States Patent [19]

Sato et al.

[11] Patent Number: 5,493,361
[45] Date of Patent: Feb. 20, 1996

[54] FOCUS CORRECTING APPARATUS FOR AN AUTO FOCUS CAMERA

[75] Inventors: Shigemasa Sato, Yokohama; Atsushi Shibayama, Kawasaki, both of Japan

[73] Assignee: Nikon Corporation, Tokyo, Japan

[21] Appl. No.: 261,870

[22] Filed: Jun. 17, 1994

Related U.S. Application Data

[63] Continuation of Ser. No. 8,283, Jan. 25, 1993, abandoned.

[30] Foreign Application Priority Data

Jan. 29, 1992 [JP] Japan ................... 4-013623

[51] Int. Cl.⁶ .................................................. G03B 13/36
[52] U.S. Cl. ............................................ 354/400; 354/286
[58] Field of Search .................................... 354/400, 402, 354/403, 412, 286

[56] References Cited

U.S. PATENT DOCUMENTS

| | | | |
|---|---|---|---|
| 4,423,934 | 1/1984 | Lambeth et al. | 354/412 |
| 4,812,868 | 3/1989 | Utagawa et al. | 354/402 |
| 4,818,865 | 4/1989 | Matsui et al. | 354/403 |
| 4,878,079 | 10/1989 | Hamada et al. | 354/402 |
| 4,890,133 | 12/1989 | Ogawa et al. | 354/402 |
| 4,897,683 | 1/1990 | Suzuki et al. | 354/400 |
| 4,912,493 | 3/1990 | Tanaka | 354/400 |
| 4,914,464 | 4/1990 | Azuma et al. | 354/400 |
| 4,924,253 | 5/1990 | Imai et al. | 354/400 |
| 4,982,216 | 1/1991 | Kudo et al. | 354/400 |
| 5,172,154 | 12/1992 | Katagishi et al. | 354/402 |

FOREIGN PATENT DOCUMENTS

| | | |
|---|---|---|
| 1-201633 | 1/1989 | Japan . |
| 3-98004 | 3/1991 | Japan . |
| 3-141310 | 3/1991 | Japan . |

*Primary Examiner*—Russell E. Adams

[57] ABSTRACT

A focus correcting apparatus for an auto focus camera having non-TTL type distance measuring means has first memory means for memorizing the amount of deviation of an imaging point from the surface of film caused by the irregularity during lens assembly or the irregularity of the dimensions of lens parts or the refractive indices of lens materials, calculating means for calculating the amount of correction movement of a focusing lens group from the memorized value in the first memory means and the amount of movement of the imaging point per unit amount of movement of the focusing lens group, and lens driving means for driving the focusing lens group on the basis of the final amount of movement consisting of the amount of movement of the focusing lens group calculated from a measured distance value obtained by the non-TTL type distance measuring means, plus the amount of correction movement of the focusing lens group found by the calculation.

26 Claims, 5 Drawing Sheets

5,493,361

FOCUS CORRECTING APPARATUS FOR AN AUTO FOCUS CAMERA

This is a continuation of application Ser. No. 08/008,283 filed Jan. 25, 1993, now abandoned.

BACKGROUND OF THE INVENTION

1. Field of the Invention

This invention relates to a focus correcting apparatus for an auto focus camera.

2. Related Background Art

In the manufacture of camera lenses, irregularity occurs to the dimensions of lens parts and the refractive indices of lens materials and further, irregularity during the assembly of the lenses also occurs and therefore, in each of individual lenses, irregularity occurs to the imaging point thereof.

Heretofore, in order to correct such irregularity of the imaging point, the whole or a part of a camera lens unit has been moved to thereby correct the imaging point when the lens unit is incorporated into a camera body.

However, it has required much time and labor to measure the imaging point for each camera and make adjustment conforming to the amount of deviation, and since man power has been resorted to for the adjustment, there has been much irregularity of adjustment accuracy.

SUMMARY OF THE INVENTION

The present invention has as its object the provision of a focus correcting apparatus for an auto focus camera which is designed to memorize the amount of deviation of the imaging point of a lens from the surface of film for each camera, calculate the amount of movement of a focusing lens group from the memorized value and the amount of movement of the imaging point per unit amount of movement of the focusing lens group, and correct the amount of focusing lens movement.

An auto focus camera having the non-TTL type distance measuring means of the present invention has first memory means for memorizing the amount of deviation of the imaging point from the surface of film caused by the irregularity during lens assembly or the irregularity of the dimensions of lens parts or the refractive indices of lens materials, calculating means for calculating the amount of correction movement of the focusing lens groups from the memorized value in said first memory means and the amount of movement of the imaging point per unit amount of movement of the focusing lens group, and lens driving means for driving the focusing lens group on the basis of the final amount of movement consisting of the amount of movement of the focusing lens group calculated from the distance of the object obtained by said non-TTL type distance measuring means, plus the amount of correction movement of the focusing lens group found by said calculation.

DESCRIPTION OF THE PREFERRED EMBODIMENTS

Figure 2:
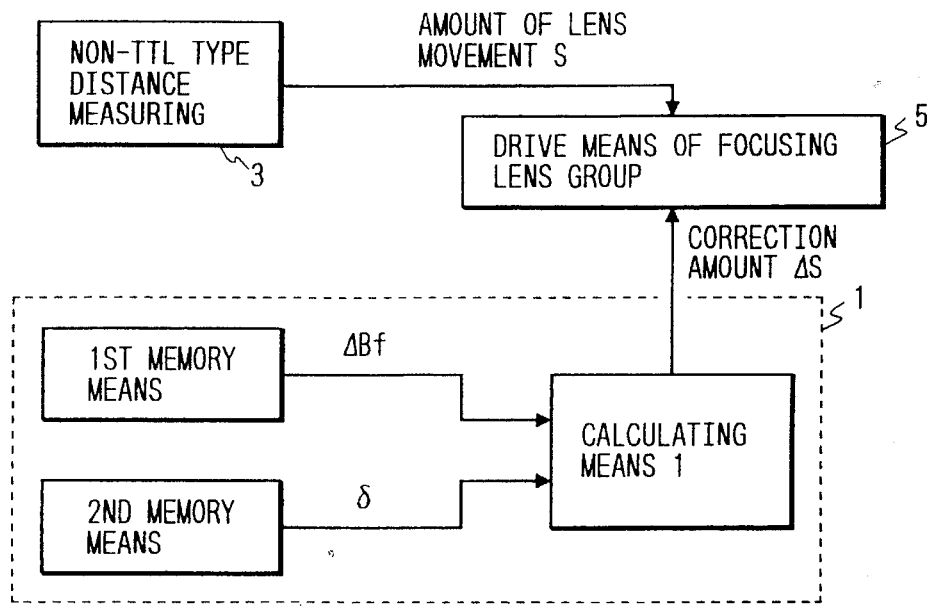
FIG. 2 is a block diagram of the apparatus of the present invention.

In a focus correcting apparatus for an auto focus camera according to the present invention, as shown in FIG. 2, the amount of movement S of a focusing lens group is found from distance information obtained by non-TTL type distance measuring means 3.

Figure 1A:
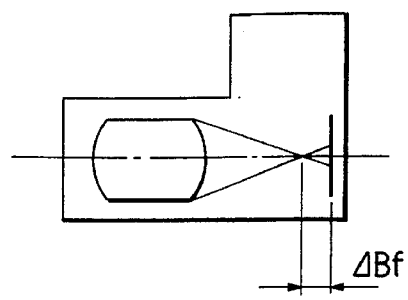
FIG. 1A shows the amount of movement ΔBf in the case of a single-focus lens.

On the other hand, FIG. 1A shows a camera provided with a single-focus lens, and the amount of deviation ΔBf of the imaging point from the surface of film caused by the irregularity during the assembly of the lens or the irregularity of the dimensions of lens parts or the refractive index of lens material is memorized in first memory means after the assembly of the camera body.

Figure 1B:
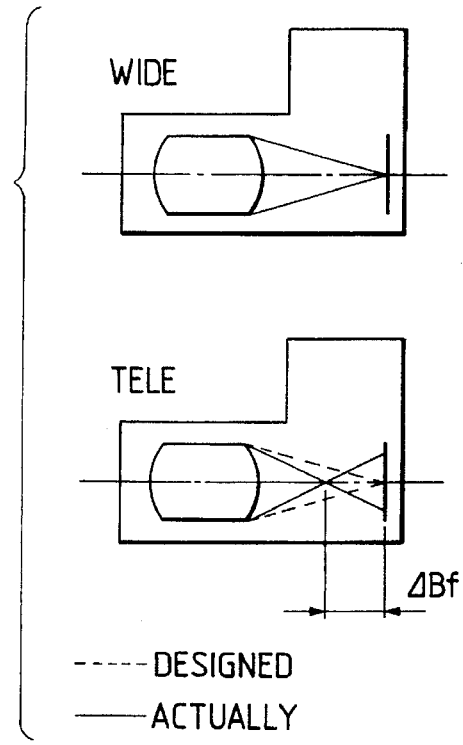
FIG. 1B shows the manner in which the design value and the actually measured value of the imaging point in the case of a multifocus lens or a zoom lens differ between during the wide angle and during the telephoto.

As shown in FIG. 1A, in a single-focus lens, the value of ΔBf assumes only one value, but as shown in FIG. 1B, in a camera provided with a multifocus lens or a zoom lens, the amount of deviation ΔBf of the imaging point from the surface of film caused by the irregularity during the assembly of the lens or the irregularity of the dimensions of lens parts or the refractive index of lens material usually assumes a different value for each focal length. However, an attempt to memorize the amount of deviation ΔBf of the imaging point from the surface of film for each focal length requires the memory capacity of the first memory means to be made great, and this is disadvantageous for the downsizing of the camera and a reduction in the costs of the camera.

Figure 1C:
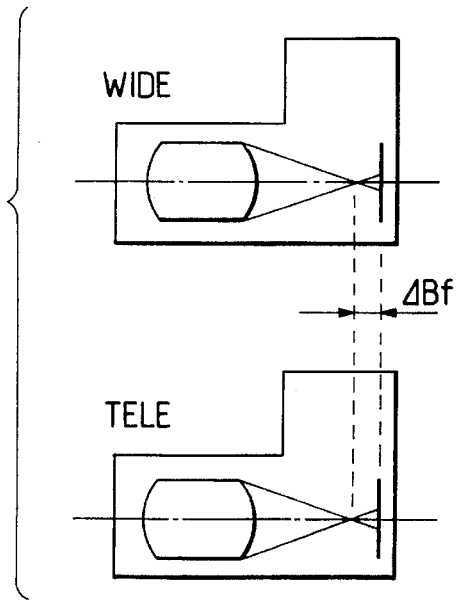
FIG. 1C shows the amount of deviation ΔBf occurring when the deviation shown in FIG. 1B is adjusted so as to become the same during the wide angle and during the telephoto.

So, in the present invention, in the case of a multifocus lens or a zoom lens, as shown in FIG. 1C, a portion of the lens system is moved to adjust the amount of deviation ΔBf of the imaging point from the surface of film so as to be substantially equal at the wide angle end and at the telephoto end. (Such adjustment is called zooming adjustment in zoom lenses for popular lens interchange type single-lens reflex camera, and is effected without fail.)

Also, in a zoom lens, the deviation of the amount of deviation ΔBf in the intermediate focal length state after the zooming adjustment from the amount of deviation ΔBf at the wide angle end and the telephoto end can be suppressed within the depth of focus if a zooming cam is made accurately.

So, only the amount of deviation ΔBf at the wide angle end or the telephoto end can be memorized as the typical value of the amount of deviation ΔBf of the imaging point from the surface of film.

Also, the amount of movement of the imaging point (the image plane position) when the focusing lens group is moved by a unit amount of movement is memorized in second memory means. This amount of movement will hereinafter referred to as the image plane movement speed. In the case of the type in which the entire lens system is moved to effect focusing, i.e., the so-called total lens movement type, the image plane movement speed assumes a constant 1 in any of a single-focus lens, a multifocus lens and a zoom lens. However, in the case of any other focusing type than the total lens movement type, the image plane movement speed assumes a value multiplied by a certain magnification, and further in the case of a multifocus lens or a zoom lens, it assumes a different value for each focal length.

So, in a multifocus lens or a zoom lens of any other type than the total lens movement type, it is necessary that the image plane movement speed at a plurality of focal lengths be memorized in the second memory means.

Also, in calculating means 1 in FIG. 2, the calculation that $$\Delta S = \Delta Bf/\delta \tag{1}$$

is effected from the amount of deviation $\Delta Bf$ of the imaging point from the surface of film memorized in the first memory means and the image plane movement speed $\delta$ memorized in the second memory means, thereby obtaining the amount of lens movement correction $\Delta S$. By giving an amount of lens movement $S+\Delta S$, a good focused state can be obtained.

Figure 3:
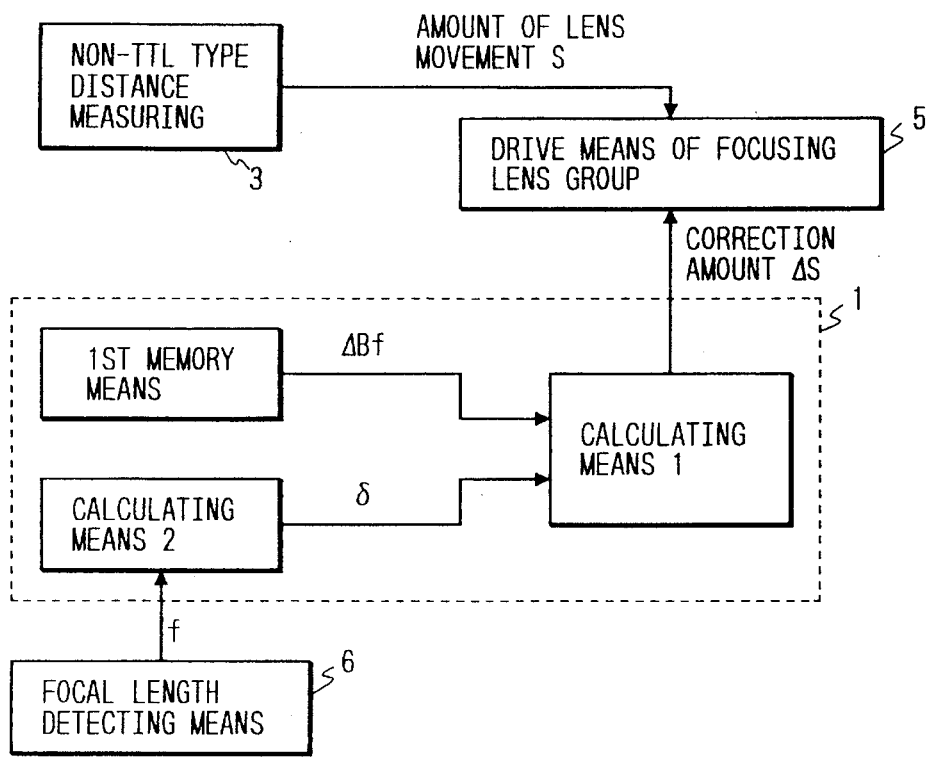
FIG. 3 is a block diagram showing first to third embodiments of the present invention.

Also, in the case of a zoom lens, as shown in FIG. 3, it is possible to find the image plane movement speed $\delta$ by the calculation effected by the calculating means 2 from the focal length information detected by focal length detecting means 6. In this case, it is unnecessary to memorize the image plane movement speed $\delta$ for each focal length, and this saves the memory capacity and is advantageous. This effect is particularly effective in the case of a high variable power ratio zoom lens in which the variation in the image plane movement speed $\delta$ is great.

Of course, in the case of a multifocus lens or a zoom lens, for each focal length, the image plane movement speed $\delta$ may be memorized as a table in memory means such as an ROM in the camera.

<Embodiment 1>

Figure 4:
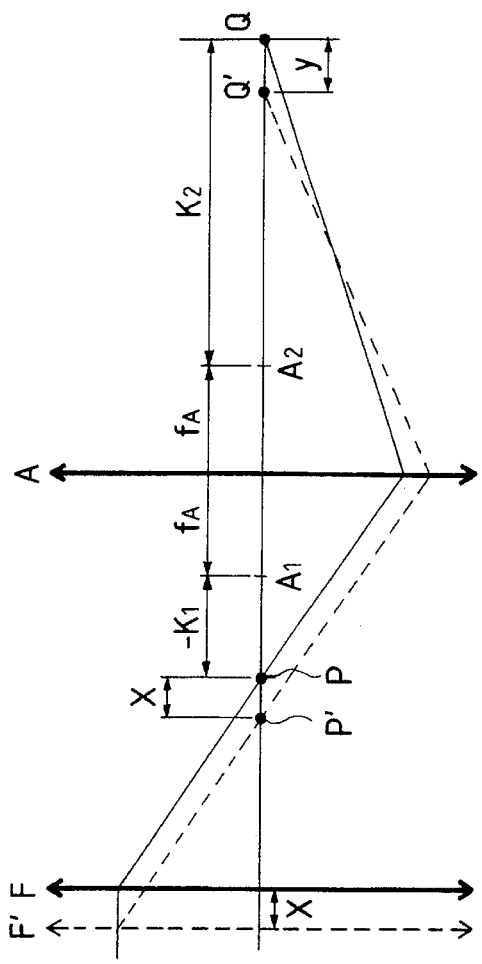
FIG. 4 shows an example of the first lens group movement focusing type zoom lens.

FIG. 4 shows an example of the one group movement focusing type zoom lens. F designates a focusing lens group, the focal length of which is $f_F$. A denotes a magnification changing lens group comprising a plurality of lens group, and the imaging magnification and the composite focal length thereof are $\beta_A$ and $f_A$, respectively.

Also, when the focal length of the entire zoom lens system is f, $\beta_A$ depends on f and is in the following relation:

$$\beta_A = f/f_F \tag{2}$$

Also, when with respect to the magnification changing lens group, the distance from the front side focus $A_1$ of the magnification changing lens group to the imaging point by the focusing lens group F, i.e., the object point P for the magnification changing lens group, is $-k_1$ and the distance from the rear side focus $A_2$ of the magnification changing lens group to the imaging point Q is $k_2$, from Newton's expression, $$\beta_A = f_A/k_1 = -k_2/f_A \tag{3}$$

$$-k_1 \cdot k_2 = f_A^2. \tag{4}$$

Also, when the focusing lens group F is moved by x, the object point for the magnification changing lens group moves to P' and the imaging point moves to Q'. Usually, the photographing distance is sufficiently great as compared with the focal length $f_F$ of the focusing lens group F and therefore can be approximated as $\overline{PP'}=x$.

Also, if $\overline{QQ'}=y$, from Newton's expression, $$(-k_1+x)(k_2-y)=f_A^2. \tag{5}$$

When the both sides of equation (4) is subtracted from the both sides of equation (5), the following equation is obtained:

$$k_1 \cdot y + k_2 \cdot x - x \cdot y = 0 \tag{6}$$

Here, |x| and |y| are sufficiently small as compared with $|k_1|$ and $|k_2|$ and therefore, this equation can be approximated as $$k_1 \cdot y + k_2 \cdot x = 0. \tag{7}$$

From equation (3) and equation (7), $$y/x = \beta_A^2 \tag{8}$$

and from equation (2), $$y/x = (f/f_F)^2. \tag{9}$$

Also, the image plane movement speed $\delta$ is $$\delta = y/x \tag{10}$$

and therefore, from equations (9) and (10), $\delta$ is expressed by $$\delta = (f/f_F)^2. \tag{11}$$

The focal length $f_F$ of the focusing lens group in the right side of this equation (11) is a constant and therefore, the image plane movement speed $\delta$ is a function of only the focal length f of the entire system. This functional expression (11) is put into the calculating means 2 in FIG. 3, and the image plane movement speed $\delta$ is calculated from the focal length f detected by the focal length detecting means 6.

The amount of lens movement correction $\Delta S$ is calculated from the memorized value $\Delta Bf$ in the first memory means in FIG. 3 and the image plane movement speed $\delta$ by equation (1) in the calculating means 1.

On the other hand, when the amount of lens movement S is found from the measured distance value in the non-TTL type distance measuring means 3 and an amount of lens amount $S+\Delta S$ is given to the focusing lens group by drive means 5 for the focusing lens group, a good focused state can be obtained in any focal length state from the wide angle end to the telephoto end.

<Embodiment 2>

Figure 5:
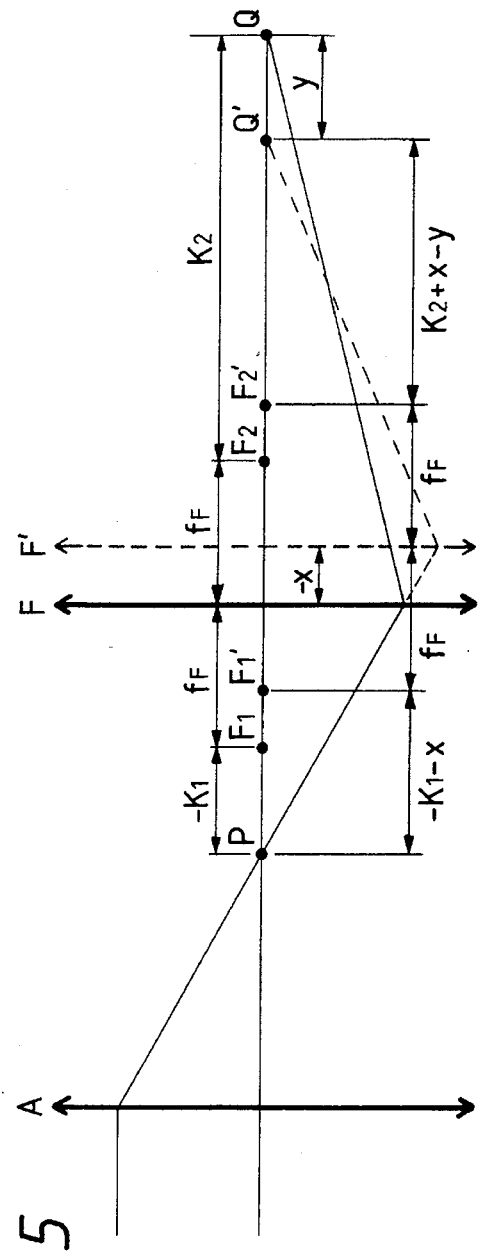
FIG. 5 shows an example of the rear focus type zoom lens.

FIG. 5 shows an example of the rear focus type zoom lens. F designates a focusing rear lens group, the focal length and the imaging magnification of which are $f_F$ and $\beta_F$, respectively. A denotes a front lens group comprising one or more lens groups, and the composite focal length thereof if $f_A$.

Also, when the focal length of the entire zoom lens system is f, $\beta_F$ depends on f and $f_A$ and is in the relation that $$\beta_F = f/f_A. \tag{12}$$

When with respect to the focusing rear lens group F, the distance from the front side focus $F_1$ of the focusing rear lens group F to the image point by the front lens group A, i.e., the object point P for the focusing rear lens group, is $-k_1$ and the distance from the rear side focus $F_2$ of the focusing rear lens group to the imaging point Q is $k_2$, from Newton's expression, $$\beta_F = f_F/k_1 = -k_2/f_F \quad (13)$$

$$-k_1 \cdot k_2 = f_F^2. \quad (14)$$

Also, when the focusing rear lens group F is moved back by $-x$, the imaging point moves to Q'.

At this time, the distance from the front side $F_1'$ of the focusing rear lens group F after moved to the point P is $-k_1-x$ and the distance from the rear side focus $F_2'$ to the imaging point Q' is $k_2+x-y$.

Thus, from Newton's expression, $$(-k_1-x)(k_2+x-y) = f_F^2. \quad (15)$$

When the both sides of equation (14) is substracted from the both sides of equation (15), the following equation is obtained:

$$-(k_1+k_2) x + k_1 y - x^2 + xy = 0 \quad (16)$$

Here, $|x|$ and $|y|$ are sufficiently small as compared with $|k_1|$ and $|k_2|$ and therefore can be approximated as $$-(k_1+k_2) x + k_1 y = 0. \quad (17)$$

From equation (13) and equation (17), $$y/x = 1 + k_2/k_1 = 1 - \beta_F^2 \quad (18)$$

and from equation (12), $$y/x = 1 - (f/f_A)^2 \quad (19)$$

and the image plane movement speed $\delta$ is expressed by $$\delta = 1 - (f/f_A)^2. \quad (20)$$

When the lens spacing in the front lens group is invariable during zooming, the focal length $f_A$ of the front lens group is a constant and the image plane movement speed $\delta$ becomes a function of only the focal length f of the entire system.

On the other hand, when the lens spacing in the front lens group varies during zooming, the focal length $f_A$ of the front lens group becomes a function of only the focal length f of the entire system if the locus of zooming is determined, and the image plane movement speed $\delta$ becomes a function of only the focal length f of the entire system.

In both cases, the image plane movement speed becomes a function of only the focal length f of the entire system, and if the above functional expression 20 or $$\delta = 1 - (f/f_A(f))^2 \quad (21)$$

is put into the calculating means 2 in FIG. 3, the image plane movement speed $\delta$ and the amount of lens $\delta$ movement correction $\Delta S$ can be calculated as in the first embodiment.

<Embodiment 3>

Figure 6:
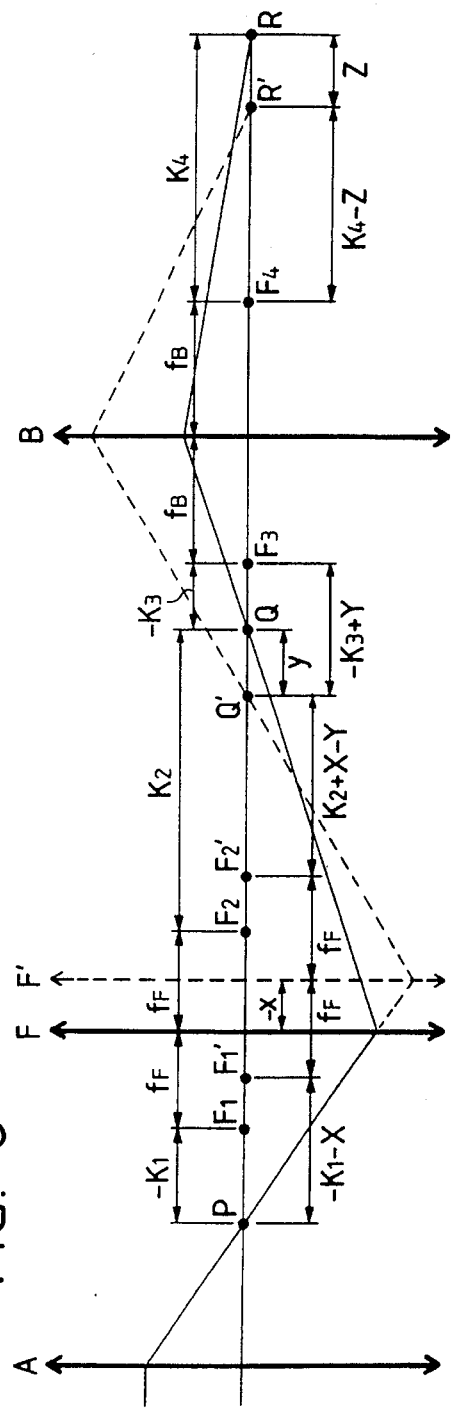
FIG. 6 shows an example of the inner focus type zoom lens.

FIG. 6 shows an example of the inner focus type zoom lens. A designates a front lens group comprising a plurality of lens groups, and the composite focal length thereof is $f_A$. F denotes a focusing leng group, the focal length and the imaging magnification of which are $f_F$ and $\beta_F$, respectively.

Further, B designates a rear lens group comprising a plurality of lens groups, and the composite focal length and the imaging magnification thereof are $f_B$ and $\beta_B$, respectively.

When the focal length of the entire zoom lens system is f, $$f = f_A \cdot \beta_F \cdot \beta_B. \quad (22)$$

When with respect to the focusing lens group F, the distance from the front side focus $F_1$ of the focusing lens group F to the imaging point by the front lens group A, i.e., the object point P for the focusing lens group, is $-k_1$ and the distance from the rear side focus $F_2$ of the focusing lens group to the imaging point Q by the focusing lens group is $k_2$, from Newton's expression, $$\beta_F = f_F/k_1 = -k_2/f_F \quad (23)$$

$$-k_1 \cdot k_2 = f_F^2. \quad (24)$$

Also, when the focusing lens group F is moved back by $-x$, the imaging point by the focusing lens group moves to Q'.

At this time, the distance from the front side focus $F_1'$ of the focusing lens group F after moved to the point P is $-k_1-x$ and the distance from the rear side focus $F_2'$ of the focusing lens group F to the imaging point Q' by the focusing lens group is $k_2+x-y$.

Thus, from Newton's expression, $$(-k_1-x)(k_2+x-y) = f_F^2. \quad (25)$$

When the both sides of equation (24) are subtracted from the both sides of equation (25), $$-(k_1+k_2) x + k_1 y - x^2 + xy = 0. \quad (26)$$

Here, $|x|$ and $|y|$ are sufficiently small as compared with $|k_1|$ and $|k_2|$ are therefore, $$-(k_1+k_2) x + k_1 y = 0. \quad (27)$$

From equation (23) and equation (27), $$y/x = 1 + k_2/k_1 = 1 - \beta_F^2. \quad (28)$$

From equation (22), $$y/x = 1 - (f/f_A \beta_B)^2. \quad (29)$$

On the other hand, when with respect to the rear lens group B, the distance from the front side focus $F_3$ of the rear lens group to the imaging point by the focusing lens group F, i.e., the object point Q for the rear lens group, is $-k_3$ and the distance from the rear side focus $F_4$ of the rear lens group to the imaging point R is $k_4$, from Newton's expression, $$\beta_B = f_B/k_3 = -k_4/f_B \quad (30)$$

$$-k_3 \cdot k_4 = f_B^2. \quad (31)$$

Also, when the focusing lens group is moved back by $-x$, the imaging point Q by the focusing lens group moves to Q', and the amount of movement thereof is y. At this time, the imaging point of the ray passing through the rear lens group moves to R', and the amount of movement thereof is z. At this time, the distance from the front side focus $F_3$ of the rear lens group to the point Q' is $-k_3+y$, and the distance from the rear side focus $F_4$ of the rear lens group to the point R' is $k_4-z$.

Thus, from Newton's expression, $$(-k_3+y)(k_4-z) = f_B^2. \quad (32)$$

When the both sides of equation (31) are subtracted from the both sides of equation (32), $$k_3z+k_4y-yz=0. \tag{33}$$

Here, |y| and |z| are sufficiently small as compared with |k_3| and |k_4| and therefore, $$k_3z+k_4y=0. \tag{34}$$

From equation (30) and equation (34), $$z/y=-k_4/k_3=\beta_B^2. \tag{35}$$

From equation (29) and equation (35), the image plane movement speed δ is expressed by $$\delta=z/x=\beta_B^2-f^2/f_A^2. \tag{36}$$

In equation (36), $\beta_B$ and $f_A$ are expressed by a function of only the focal length f of the entire system if the locus of zooming is determined, and the image plane movement speed δ is also expressed by a function of only the focal length f of the entire system.

If this function is put into the calculating means 2 in FIG. 3, the image plane movement speed δ and the amount of lens movement correction ΔS can be calculated as in the first and second embodiments.

Figure 7:
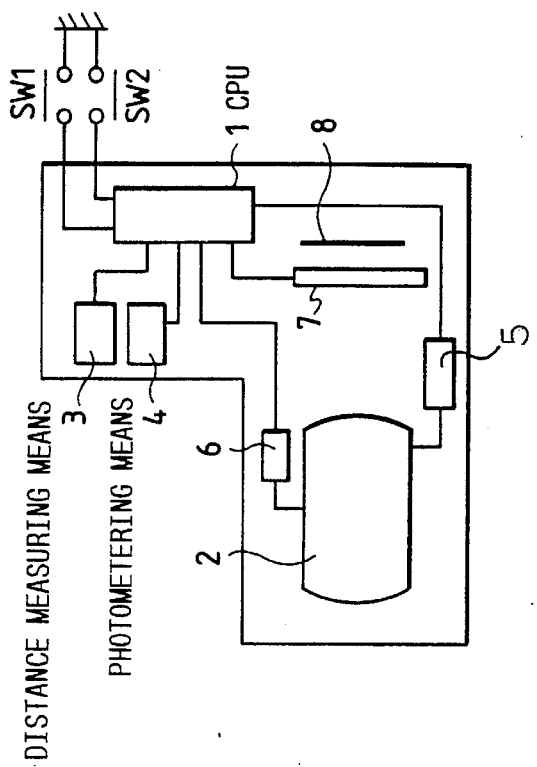
FIG. 7 shows an embodiment of the construction of a camera according to the present invention.

FIG. 7 shows an embodiment of the construction of a camera having the above-described focus correcting apparatus.

The aforedescribed non-TTL type distance measuring means 3 is connected to a CPU 1. Also, entire zoom lens system focal length detecting means 6 for detecting the focal length of a photographing zoom lens 2 for forming an image on an image plane 8 and photometering means 4 are connected to the CPU 1. The CPU 1 is started by the operations of a half depression switch SW1 and a full depression switch SW2 or other release means 7 than a release button. Further, as previously described, the signal of the result of the calculation by the CPU 1 is transmitted to focusing lens group driving means 5 to thereby drive the photographing zoom lens 2.

The above-described first memory means, second memory means, calculating means 1 and calculating means 2 are all constructed in the CPU 1.

Figure 8:
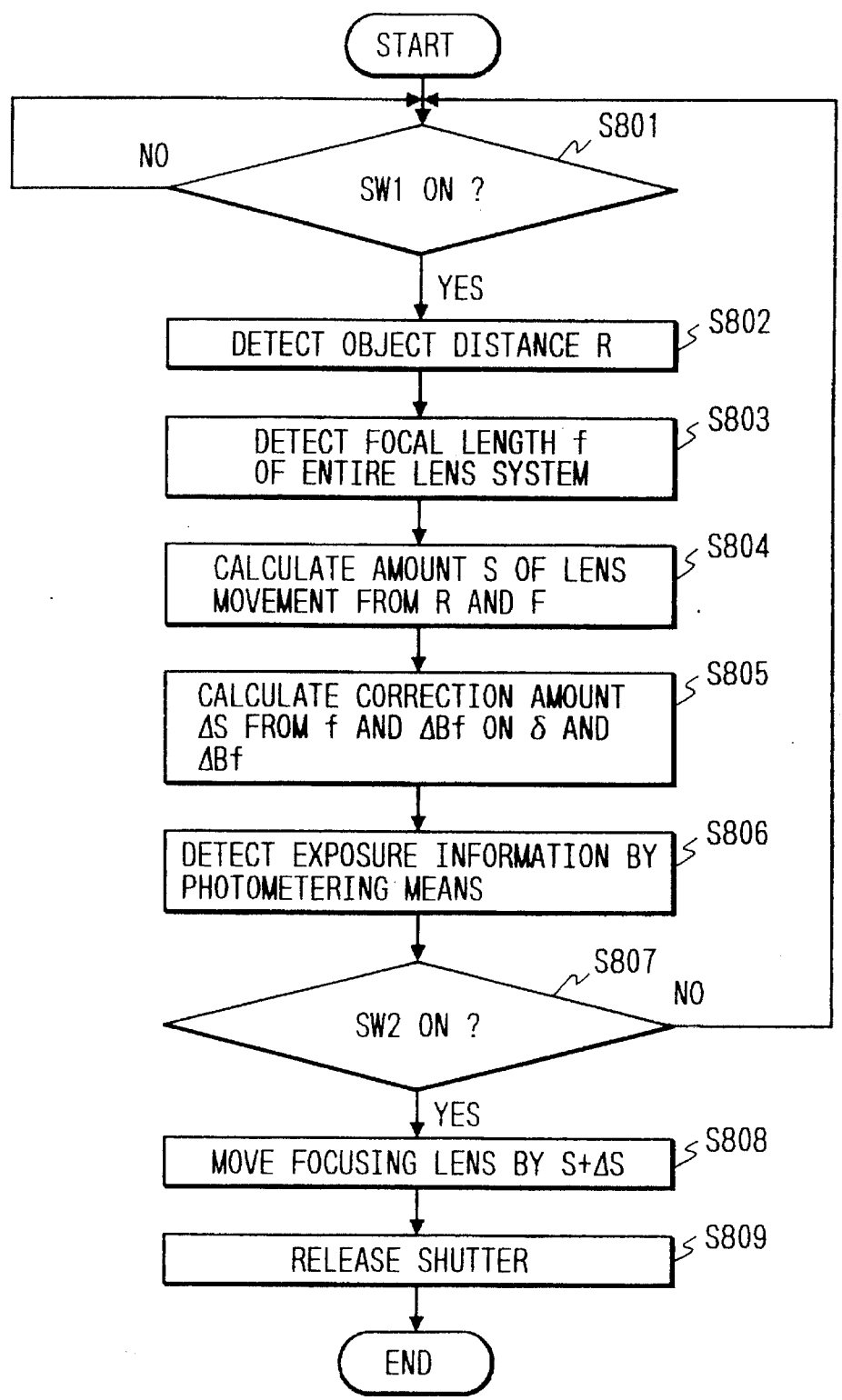
FIG. 8 is a flow chart showing the operation of the camera according to the present invention.

FIG. 8 is a flow chart showing the operations from the switching-on of a power source to the release operation during photographing by the camera having the above-described focus correcting apparatus, and the following flow is executed by the switching-on of the power source.

S801: Whether a switch adapted to be closed by the half depression of the release button (hereinafter referred to as SW1) is ON is judged, and if SW1 is ON, advance is made to S802, where the AF operation is executed, and if SW1 is OFF, this judgment is repeated.

S802: The distance to an object is measured by the non-TTL type distance measuring means 3 of outdoor daylight type active AF, outdoor daylight type passive AF or the like to thereby obtain distance information R.

S803: The detection of the focal length f of the entire photo-taking lens system is effected by the driving pulse or the like of a focal length detecting encorder provided in the photo-taking lens barrel.

S804: In the CPU provided in the camera, the amount of lens movement S of the focusing lens group is calculated by the use of the distance information R and the focal length f of the entire photo-taking lens system obtained at S802 and S803, respectively.

S805: The amount of lens movement correction ΔS of the focusing lens group is calculated from the focal length f of the entire photo-taking lens system obtained at S803 and the amount of deviation ΔBf of the imaging point from the surface of film which is memorized in the first memory means. Or the amount of lens movement correction ΔS of the focusing lens group is calculated from the amount of movement δ of the imaging point per unit amount of movement of the focusing lens group memorized in the second memory means and said ΔBf.

S806: Exposure information is obtained by the photometering means.

S807: Whether a switch adapted to be closed by the fully depressed state of the release button (hereinafter referred to as SW2) is ON is judged, and if SW2 is ON, advance is made to S808, where the focusing lens group is moved by a composite amount of lens movement S+ΔS consisting of the amount of lens movement S and the amount of lens movement ΔS obtained at S804 and S805, respectively, and if SW2 is OFF, return is made to S801.

S808: The focusing lens group is driven by the amount of lens movement S+ΔS by the use of a driving motor or the like so that the object image may be formed on the image plane 8 (the surface of film).

S809: A series of operations including the exposure operation of the release means 7 are performed.

The deviation of the image plane from the surface of film caused by the manufacture or assembly of parts can be corrected simply by causing the measured amount of deviation to be memorized, and the mechanical adjustment by man power for each camera as in the prior art is not required and thus, costs required for the adjustment can be reduced and the compactness of the lens unit can be achieved.

What is claimed is:

1. A focus correcting apparatus for an auto focus camera having non-TTL type distance measuring means, characterized by:

a photo-taking lens of a focusing type other than a total lens movement focusing type;

first memory means for memorizing an amount of deviation of an imaging point from the surface of film caused by irregularity during lens assembly or irregularity of the dimensions of lens parts or the refractive indices of lens materials;

calculating means for calculating an amount of correction movement of a focusing lens group from the memorized amount in said first memory means and an amount of movement of the imaging point per unit amount of movement of the focusing lens group; and lens driving means for driving the focusing lens group on the basis of the final amount of movement consisting of an amount of movement of the focusing lens group calculated from a measured distance value obtained by said non-TTL type distance measuring means, plus the amount of correction movement of the focusing lens group found by said calculation.

2. A focus correcting apparatus for an auto focus camera according to claim 1, further having second memory means for memorizing the amount of movement of the imaging point relative to the unit amount of movement of the focusing lens group.

3. A focus correcting apparatus for an auto focus camera according to claim 2, wherein said auto focus camera is provided with a multifocus lens as a photo-taking lens, said second memory means memorizes the amount of movement of the imaging point per unit amount of movement of the focusing lens group in a plurality of focal length states, and said first memory means memorizes the amount of deviation of the imaging point from the surface of film in a plurality of focal length states as represented by a single value.

4. A focus correcting apparatus for an auto focus camera according to claim 2, wherein said auto focus camera is provided with a zoom lens as a photo-taking lens, said second memory means memorizes the amount of movement of the imaging point per unit amount of movement of the focusing lens group in a plurality of focal length states, and said first memory means memorizes the amount of deviation of the imaging point from the surface of film in a plurality of focal length states as represented by a single value.

5. A focus correcting apparatus for an auto focus camera according to claim 1, wherein said auto focus camera is provided with a zoom lens as a photo-taking lens, the amount of movement of the imaging point per unit amount of movement of the focusing lens group is found from the focal length of the zoom lens by calculation, and said first memory means memorizes the amount of deviation of the imaging point from the surface of film in a plurality of focal length states as represented by a single value.

6. A focus correcting apparatus according to claim 5, wherein said zoom lens has a focusing lens group most adjacent to the object side, said apparatus has detecting means for detecting the focal length of the zoom lens, and when the focal length of said focusing lens group is $f_F$ and the focal length detected by said detecting means is $f$, the amount of movement $\delta$ of the imaging point per unit amount of movement of the focusing lens group is found by a calculation expressed by $\delta=(f/f_F)^2$.

7. A focus correcting apparatus according to claim 5, wherein the zoom lens has a focusing rear lens group most adjacent to the image side and a front lens group on the object side of said focusing rear lens group, said apparatus has detecting means for detecting the focal length of the zoom lens, and when the focal length of said front lens group is $f_A$ and the focal length detected by said detecting means is $f$, the amount of movement $\delta$ of the imaging point per unit amount of movement of the focusing rear lens group is found by a calculation expressed by $\delta=1-(f/f_A)^2$.

8. A focus correcting apparatus according to claim 7, wherein the focal length $f_A$ of said front lens group is found from the focal length $f$ of the zoom lens detected by said detecting means.

9. A focus correcting apparatus according to claim 5, wherein the zoom lens has a focusing lens group, a front lens group on the object side of said focusing lens group, and a rear lens group on the image side of said focusing lens group, said apparatus has detecting means for detecting the focal length of the zoom lens, and when the focal length of said front lens group is $f_A$ and the imaging magnification of said rear lens group is $\beta_B$ and the focal length detected by said detecting means is $f$, the amount of movement $\delta$ of the imaging point per unit amount of movement of the focusing lens group is found by a calculation expressed by $\delta=\beta_B^2-(f/f_A)^2$.

10. A focus correcting apparatus according to claim 9, wherein the focal length $f_A$ of said front lens group is found from the focal length $f$ of the zoom lens detected by said detecting means.

11. A focus correcting apparatus according to claim 9, wherein the imaging magnification $\beta_B$ of said rear lens group is found from the focal length $f$ of the zoom lens detected by said detecting means.

12. A focus correcting apparatus according to claim 9, wherein the focal length $f_A$ of said front lens group and the imaging magnification $\beta_B$ of said rear lens group are found from the focal length $f$ of the zoom lens detected by said detecting means.

13. A focus correcting apparatus for an auto focus camera having a non-TTL type distance measuring device, characterized by:

a photo-taking lens of a focusing type other than a total lens movement focusing type;

a first memory for memorizing an amount of deviation of an imaging point from the surface of film caused by irregularity during lens assembly or irregularity of the dimensions of lens parts or the refractive indices of lens materials;

a calculator for calculating an amount of correction movement of a focusing lens group from the memorized amount in said first memory and an amount of movement of the imaging point per unit amount of movement of the focusing lens group; and a lens driver for driving the focusing lens group on the basis of the final amount of movement consisting of an amount of movement of the focusing lens group calculated from a measured distance value obtained by said non-TTL type distance measuring device, plus the amount of correction movement of the focusing lens group found by said calculation.

14. A focus correcting apparatus for an auto focus camera according to claim 13, further having a second memory for memorizing the amount of movement of the imaging point relative to the unit amount of movement of the focusing lens group.

15. A focus correcting apparatus for an auto focus camera according to claim 14, wherein said auto focus camera is provided with a multifocus lens as a photo-taking lens, said second memory memorizes the amount of movement of the imaging point per unit amount of movement of the focusing lens group in a plurality of focal length states, and said first memory memorizes the amount of deviation of the imaging point from the surface of film in a plurality of focal length states as represented by a single value.

16. A focus correcting apparatus for an auto focus camera according to claim 14, wherein said auto focus camera is provided with a zoom lens as a photo-taking lens, said second memory memorizes the amount of movement of the imaging point per unit amount of movement of the focusing lens group in a plurality of focal length states, and said first memory memorizes the amount of deviation of the imaging point from the surface of film in a plurality of focal length states as represented by a single value.

17. A focus correcting apparatus for an auto focus camera according to claim 13, wherein said auto focus camera is provided with a zoom lens as a photo-taking lens, the amount of movement of the imaging point per unit amount of movement of the focusing lens group is found from the focal length of the zoom lens by calculation, and said first memory memorizes the amount of deviation of the imaging point from the surface of film in a plurality of focal length states as represented by a single value.

18. A focus correcting apparatus according to claim 17, wherein said zoom lens has a focusing lens group most adjacent to the object side, said apparatus has a detector for detecting the focal length of the zoom lens, and when the focal length of said focusing lens group is $f_F$ and the focal length detected by said detector is $f$, the amount of movement $\delta$ of the imaging point per unit amount of movement of the focusing lens group is found by a calculation expressed by $\delta=(f/f_F)^2$.

19. A focus correcting apparatus according to claim 17, wherein the zoom lens has a focusing rear lens group most adjacent to the image side and a front lens group on the object side of said focusing rear lens group, said apparatus has a detector for detecting the focal length of the zoom lens, and when the focal length of said front lens group is $f_A$ and the focal length detected by said detector is $f$, the amount of movement $\delta$ of the imaging point per unit amount of movement of the focusing rear lens group is found by a calculation expressed by $\delta=1-(f/f_A)^2$.

20. A focus correcting apparatus according to claim 19, wherein the focal length $f_A$ of said front lens group is found from the focal length $f$ of the zoom lens detected by said detector.

21. A focus correcting apparatus according to claim 17, wherein the zoom lens has a focusing lens group, a front lens group on the object side of said focusing lens group, and a rear lens group on the image side of said focusing lens group, said apparatus has a detector for detecting the focal length of the zoom lens, and when the focal length of said front lens group is $f_A$ and the imaging magnification of said rear lens group is $\beta_B$ and the focal length detected by said detector is $f$, the amount of movement $\delta$ of the imaging point per unit amount of movement of the focusing lens group is found by a calculation expressed by $\delta=\beta_B^2-(f/f_A)^2$.

22. A focus correcting apparatus according to claim 21, wherein the focal length $f_A$ of said front lens group is found from the focal length $f$ of the zoom lens detected by said detector.

23. A focus correcting apparatus according to claim 21, wherein the imaging magnification $\beta_B$ of said rear lens group is found from the focal length $f$ of the zoom lens detected by said detector.

24. A focus correcting apparatus according to claim 21, wherein the focal length $f_A$ of said front lens group and the imaging magnification $\beta_B$ of said rear lens group are found from the focal length $f$ of the zoom lens detected by said detector.

25. A method for performing a focus correction of an auto focus camera having a non-TTL type distance measuring device and using a photo-taking lens of a focusing type other than a total lens movement focusing type, comprising the steps of:

memorizing an amount of deviation of an imaging point from the surface of film caused by irregularity during lens assembly or irregularity of the dimensions of lens parts or the refractive indices of lens materials;

calculating an amount of correction movement of a focusing lens group from the memorized amount and an amount of movement of the imaging point per unit amount of movement of the focusing lens group; and driving the focusing lens group on the basis of a final amount of movement consisting of the amount of movement of the focusing lens group calculated from a measured distance value obtained by said non-TTL type distance measuring device, plus the amount of correction movement of the focusing lens group found by said calculation.

26. A method according to claim 25, further comprising a step of memorizing the amount of movement of the imaging point relative to the unit amount of movement of the focusing lens group.

* * * * *

UNITED STATES PATENT AND TRADEMARK OFFICE
CERTIFICATE OF CORRECTION

PATENT NO. : 5,493,361
DATED : February 20, 1996
INVENTOR(S) : Shigemasa SATO, et al.

It is certified that error appears in the above-indentified patent and that said Letters Patent is hereby corrected as shown below:

On the title page, item:

[75] Title Page "Yokohama" should be --Chiba--.

Signed and Sealed this

Sixteenth Day of July, 1996

Attest:

BRUCE LEHMAN

Attesting Officer

Commissioner of Patents and Trademarks